United States Patent [19]

Shorr et al.

[11] 3,864,204

[45] Feb. 4, 1975

[54] MULTILAYERED SAFETY GLASS

[75] Inventors: Norman Shorr, Mt. Lebanon Township; Harry E. Littell, Jr., Shaler Township, both of Pa.

[73] Assignee: PPG Industries, Inc., Pittsburgh, Pa.

[22] Filed: Apr. 24, 1969

[21] Appl. No.: 819,045

[52] U.S. Cl. ............... 161/190, 161/165, 161/194, 161/199, 161/404
[51] Int. Cl. ............................................. F41h 5/26
[58] Field of Search ............ 89/36 A; 109/10, 58.5, 109/80; 161/165, 166, 183, 185, 190, 192, 161/194, 195, 197–204, 404

[56] References Cited
UNITED STATES PATENTS

| | | | |
|---|---|---|---|
| 2,650,976 | 9/1953 | Gaiser et al. | 161/204 X |
| 3,393,485 | 7/1968 | Wright | 89/36 A UX |
| 3,424,642 | 1/1969 | Orcutt | 161/199 X |
| 3,509,015 | 4/1970 | Wismer et al. | 161/190 |

*Primary Examiner*—Stephen C. Bentley
*Attorney, Agent, or Firm*—Edward I. Mates

[57] ABSTRACT

A multilayered safety glass laminate comprising a plurality of alternate plies of glass and thermoplastic transparent interlayers arranged to provide an impact striking sectiion, a transition section and a novel impact absorption section. The laminate has bullet-resistant capability over a wide range of temperatures including severely cold temperatures. The novel impact absorption section comprises the penultimate and innermost glass plies of the laminate that are relatively thin compared to the other glass plies located in the impact striking section. The relatively thin glass plies of the novel impact absorption section are laminated to the opposite sides of an interlayer whose thickness is intermediate that of a relatively thick interlayer that serves as the impact transition section and that of the interlayers of the impact striking sections.

8 Claims, 1 Drawing Figure

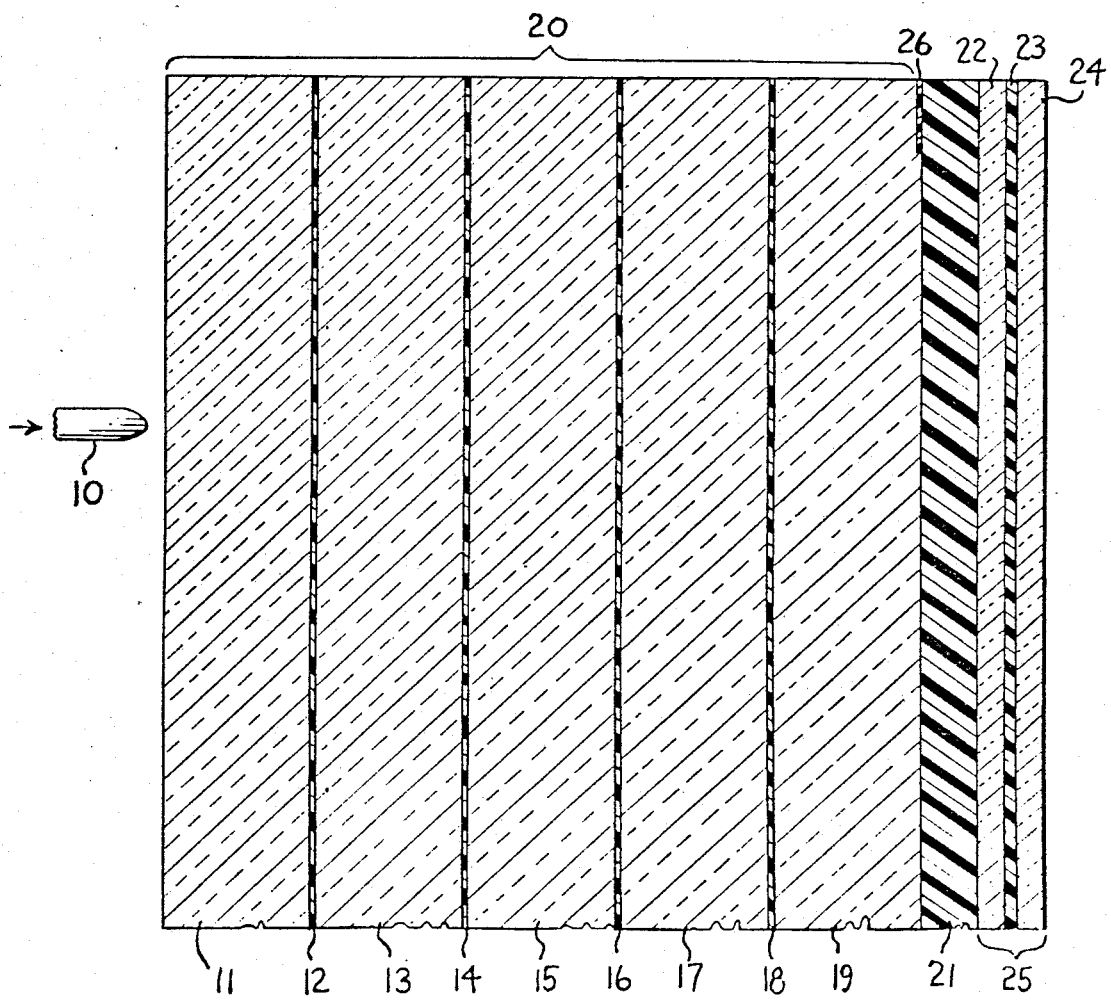

MULTILAYERED SAFETY GLASS

This invention relates to transparent armor plate composed of multiple alternating layers of glass and plastic frequently referred to as MULTIPLATE safety glass. MULTIPLATE is a registered trademark of PPG Industries, Inc. that is commonly given to laminated glass-plastic windows comprising alternate plies of glass and transparent thermoplastic interlayers suitable to resist the penetration of bullets or other projectiles through their thickness.

Bullet resisting glass structures are designed to afford protection against bullets of a particular class and/or range of velocities. Generally speaking, when protection is desired against non-military devices, bullet resisting glass structures need only protect against light or medium calibre ball-type projectiles. Bullet resisting glass structures intended to afford protection for military combatants must also protect against higher calibre, higher velocity, ball and armor piercing projectiles. In addition, it is desired to have minimal areal density consistent with adequate bullet-resisting performance for military vehicles. Multilayered glass for tanks should be as light as possible for a given bullet-resisting capability to permit the tanks to operate with maximum velocity for a given size engine. Multilayered safety glass windows for aircraft likewise are desired to be as light as possible to permit planes to carry as much equipment and/or armament as is possible and still provide relative safety for the occupants of the aircraft.

Multilayered safety glass is strengthened by increasing the number of plies of glass alternated with thermoplastic interlayers to improve the resistance of the multiplate safety glass laminate to impinging projectiles. However, such strengthening requires added mass, which reduces the payload and/or speed of the vehicle in which the safety glass is installed.

Conventional, transparent, bullet-resisting glass laminates are fabricated by assembling alternate plies of glass and plastic sheeting together and exposing the assembly to an elevated temperature and pressure to bond the plies. Each glass ply of conventional bullet-resisting glass laminates may be of equal glass thickness or of a symmetrical arrangement of thicknesses and each plastic interlayer ply is of equal plastic thickness, with the exception that, in certain structures, the innermost glass plies of certain laminates are thinner than the other plies. Some variations of conventional structure prior to the present invention involved increasing thickness of at least one of the glass plies and/or one of the plastic plies. Another variation involved substituting a rigid, thin sheet of light weight but easily scratched polycarbonate material for the innermost glass ply.

The transparent plasticized interlayer material may be composed of a polyvinyl acetal such as plasticized polyvinyl butyral, which is commonly used as the interlayer because of its adhesion to glass when subjected to suitable temperatures and pressure, because it is transparent when bonded between two sheets of glass and because of its resistance to elongation whenever an object impacts upon a laminated safety glass window such as the multilayered safety glass laminate described herein. Other transparent interlayer materials employed more recently are polyurethane compositions, sometimes introduced as partial polymers and sometimes cast in place.

In the following description, the term "interlayer" describes elastomeric material positioned between adjacent plies of glass, regardless of whether such material is initially positioned as single sheet or layer of elastomer or as several sheets or layers of elastomer. It is also contemplated that the interlayer may be formed by casting a liquid resin between adjacent glass sheets.

Multilayered safety glass laminates offer two primary safety advantages. In the event of impact by a projectile, the bonding between the glass and the interlayers holds the glass articles in the same relative position, thereby preventing the possibility of injury as a result of flying glass. Holding the particles in the same relative position also limits the possibility of having sharp edges of broken glass exposed. Another advantage of the multilayered safety glass laminate is due to the physical properties of the interlayer materials. Unlike glass and other rigid materials, an elastomer stretches prior to rupture rather than breaking immediately when subjected to impact. On impact, an elastomer elongates, thereby absorbing energy from the impacting object and reducing the velocity of the impacting object. In many instances the velocity of the impacting object is reduced to zero before the object or projectile penetrates the elastomer.

When an elastomer such as polyvinyl butyral or a polyurethane is employed as an interlayer between adjacent glass sheets, such a laminate retains some of the elastomeric properties of the elastomer. Thus, when impacted, a windshield consisting of alternate sheets of glass and interlayers will elongate in the immediate area of impact by the projectile, thereby absorbing energy from the object and reducing its velocity. This property of a multilayered safety glass laminate will be referred to as penetration resistance for the purpose of describing the present invention.

Various patents have issued recently on treatments of plasticized polyvinyl butyral as interlayer material to improve the characteristics of laminated windshields. U.S. Pat. No. 2,946,711 to Bragaw suggests using a thicker interlayer of polyvinyl butyral comprising at least two plies, one having a plasticizer content that improves the performance of the windshield at low operating temperatures and the other ply having a plasticizer content that improves the performance of the windshield at high operating temperatures. Unfortunately, this benefit is temporary, as the plasticizer migrates between the interlayer plies to tend to equalize the plasticizer content, so that both plies tend to develop substantially the same performance characteristics instead of the different characteristics developed originally by providing different plasticizer contents.

Various patents have issued on polyvinyl butyral treatments that control the alkalinity titer and/or the moisture content of the polyvinyl butyral interlayer to control its adhesion to a pair of glass sheets. These patents include U.S. Pat. Nos. 3,231,461 (Mattimoe); 3,249,487 (Buckley and Nelson); 3,249,488 (Mont and Lavin); 3,249,489 (Lavin and Mont); 3,249,490 (Lavin and Mont); 3,262,835 (Lavin, Martins and Mont); 3,262,836 (Lavin, Mont and Martins); 3,262,837 (Lavin, Mont and Price); and 3,271,233 (Lavin and Mont). Other suitable interlayer materials are recited in U.S. Pat. No. 3,344,014 to Richard W. Rees, in Canadian Pat. No. 673,674 to Marco Wismer, Michael Dufala and Vernon Ammons, and in Canadian Pat. No. 673,678 to Vernon Ammons, Michael Dufala and Marco Wismer. The multilayered safety glass laminate is also strengthened when the glass plies are formed of tempered glass rather than untempered glass. Suitable apparatus for thermal tempering is shown in U.S. Pat. Nos. 2,917,871 to Florian V. Atkeson (for tempering flat glass) and 3,294,518 to Frank B. Laseck and Walter J. Ressler, Jr. (for tempering curved glass).

What has been described thus far are the various combinations of prior art laminates. An efficient multilayered safety glass unit comprises an impact stricking section that faces the direction from which an impacting projectile comes and that comprises two or more relatively thick glass sheets adhered together by relatively thin, transparent thermoplastic interlayers; an impact transition section consisting essentially of a relatively thick layer of thermoplastic material; and an impact absorption section, which in the past has consisted of a sheet of glass or rigid plastic such as a polycarbonate. In many cases, the impact absorption section is made of glass rather than plastic to improve its resistance to abrasion, its clarity and its resistance to humidity conditions.

When such a multilayered safety glass laminate is used at low temperatures such as minus 65° Fahrenheit and lower, the relatively thick plastic of the impact transition section causes the glass sheet of the impact absorption section, which glass sheet has a lower coefficient of expansion, to spall. This spalling results from the fact that the force of adhesion between the interlayer material and the glass is greater than the cohesion between molecules of the glass. The greater adhesion force causes a tension force at the plastic facing surface of the glass sheet. The tension force is a function of the thickness of the plastic interlayer so that the force tending to cause spalling in the glass sheet of the impact absorption section can result in spall on ballistic impact that can be injurious to personnel occupying a vehicle glazed with the multilayered safety glass laminate described above.

If the glass sheet used for the impact absorption section is relatively thin, the glass spall produced is powdered, but provides insufficient counter force to the relatively rapidly shrunk plastic when used in a cold environment to prevent spalling at a temperature relatively close to but below normal room conditions. A thin glass impact absorption portion provides less resistance to a projectile that penetrates the laminate than one having a thicker glass sheet.

The present invention provides an impact absorption section of sufficient total thickness to reduce the frequency of glass spalling resulting from insufficient counter force, and yet provides a device whereby if spall is created, it is not of such a nature as to be injurious to personnel. The present invention provides this improvement by substituting a laminate, consisting essentially of two relatively thin sheets of glass and an interlayer of intermediate thickness, for the glass sheet previously used as the impact absorption section. The laminated impact absorption section of the present invention comprising two sheets of glass and a plastic interlayer provides sufficient rigidity and a sufficient counter force to the rapid shrinking of the relatively thick plastic layer of the impact transition section to minimize the frequence of cold chipping when the laminate is exposed to low temperatures.

The novel laminated impact absorption section behaves in a manner similar to a relatively thick glass sheet in countering the shrinkage force of the relatively thick plastic interlayer which comprises the impact transition section. This behavior of the laminate as a thick sheet inhibits the tendency of the inner glass sheet of the impact absorption section to warp in the direction of shrinkage of the thick interlayer sheet of the impact transition section. In addition, if spalling does occur, the thinness of the glass sheets of the impact absorption section enables the glass to spall into relatively harmless fragments of a small powdery nature under ballistic impact. Furthermore, the plastic interlayer of the laminated impact absorption section also shrinks when the thick plastic sheet of the impact transition section shrinks in response to exposing the multilayered safety glass laminate to low temperatures. This interlayer shrinkage provides a partially conterbalancing force to the warping force imparted by the shrunk impact transition section on the inner glass sheet of the laminated impact absorption section and divides the cold-chipping inducing force between the glass sheets comprising the laminated impact absorption section in a ratio approximating the thickness of the interlayer of the impact absorption section to that of the plastic sheet of the impact transition section. If desired, the spalling force on the laminated impact absorption section may be reduced by applying a parting material between the margin of the inner glass sheet surface of the impact striking section and the impact transition section.

A typical embodiment of the present invention will be described in detail to illustrate the principle by which the present invention operates. It is understood that variations can be made within the scope of the claimed subject matter that is recited following the description of the illustrative embodiment, but that optimum results are obtained when the innermost glass sheet has a maximum thickness of 0.100 inch to provide relatively harmless, powdery fragments if glass spalling occurs and when the interlayer of the novel laminated impact absorption section has a thickness that is a substantial proportion of that of the impact transition section, preferably 20 percent to 60 percent thereof.

In the drawing which forms part of the description, a projectile 10 is showing approaching a multilayered safety glass laminate constructed in accordance with the present invention. In the multilayered safety laminate construction depicted, an outward facing glass sheet 11, ½ inch thick, has inwardly thereof an interlayer 12 of plasticized polyvinyl butyral of 0.020 inch thickness. Behind the latter is another glass sheet 13, which is followed by another interlayer sheet 14, another glass sheet 15, another plastic interlayer sheet 16, another glass sheet 17, and another interlayer sheet 18 and another glass sheet 19.

The glass sheets 11, 13, 15, 17 and 19 are of equal thickness, and the interlayer sheets 12, 14, 16 and 18 are of equal thickness less than that of the glass sheets. Plies 11 to 19 inclusive comprise the impact striking section 20 of the transparent multiplate safety glass laminate. It is inherent from the above that the total thickness of the interlayer sheets in the impact striking section in the area intermediate adjacent glass sheets 11, 13, 15, 17, and 19 is approximately 0.080 inch, which is less than the thickness of any of the glass sheets in said section, and that the total thickness of the impact striking section is about 2.58 inch.

Inward of the impact striking section 20 is an impact transition section 21. The latter comprises a single sheet of relatively thick, plasticized interlayer plastic such as polyvinyl butyral. In the illustrative embodiment, the thermoplastic interlayer of the impact transition section is 0.180 inch thick. The thickness of the impact transsition section 21 is thus greater than the total thickness of the interlayer sheets in the impact striking section 20 and less than the thickness of the relatively thick glass plies in the impact striking section.

Attached to the interior surface of the relatively thick plastic sheet of the impact transition section 21 is the novel, laminated impact absorption section 25. The latter comprises a penultimate glass sheet 22 attached to a plastic interlayer 23 of intermediate thickness (about 0.090 inch) and an innermost glass sheet 24. The penultimate glass sheet or ply 22 and the innermost glass sheet or ply 24 are each about 5/64 inch thick. The glass sheets 22 and 24 are both individually and collectively thinner than the glass sheets of the impact striking section 20, while the plastic interlayer 23 is thicker than the total thickness of the plastic interlayers of the impact striking section 20, but thinner than the plastic sheet constituting the impact transition section 21.

It is evident from the thickness dimensions recited above that the impact striking section 20 has a thickness of approximately 2.58 inches, the impact transition section 21 is approximately 0.18 inch thick and the laminated impact absorption section is approximately 0.25 inch thick. Thus, the total thickness of the impact transition section 21 and that of the impact absorption section 25 is only a small fraction of the thickness of the impact striking section 20.

A thin frame of parting material 26 is applied to the marginal portion of the major surface of glass sheet 19 that faces the relatively thick plastic interlayer sheet 21 to reduce the tendency for cold-chipping of the sheet 19. A typical parting material is Scotch Tape sold by Minnesota Mining and Manufacturing Co. of St. Paul, Minnesota. The parting material forms a border ¼ inch wide. The adhesive surface of the Scotch Tape is applied against the border of the glass sheet 19 so that the smooth surface facing the relatively thick interlayer 21 is free to move along its marginal portion to alleviate somewhat the tendency of the thick glass sheet 19 to chip at low temperatures.

The following sets of laminates were fabricated in order to determine the benefits of the present invention. Two groups of test samples were prepared for each ballistic test reported below. The laminates for the first ballistic test had an impact striking section comprising 4 plies of glass ½ inch thick with adjacent glass plies bonded together with polyvinyl butyral plasticized with 21 parts by weight of triethylene glycol di-(2-ethyl butyrate) plasticizer per 100 parts of polyvinyl butyral. The polyvinyl butyral was prepared with as low a moisture content as possible to improve its adhesion to the glass.

The control samples for the first ballistic test had an impact transition section of polyvinyl butyral 0.345 inch thick containing 41 parts by weight of plasticizer added to 100 parts of polyvinyl butyral and an impact absorption section consisting of a plate of sheet glass 5/64 inch thick. The test samples for the first ballistic test had an impact transition section of the same plasticizer content as the control samples with a thickness of 0.180 inch and a laminated impact absorption section comprising two plates of sheet glass 5/64 inch thick with an interlayer of polyvinyl butyral 0.090 inch thick having the same plasticizer content sandwiched between the two plates of sheet glass.

For the second ballistics tests, the laminates had an impact striking section comprising 5 glass plies and 4 interlayers, and a ¼ inch wide frame of Scotch Tape was attached with its adhesive surface bonded to the glass. The impact transition section comprised an additional sheet of plasticized polyvinyl butyral having a thickness of 0.175 inch and 41 parts by weight of the aforesaid plasticizer per 100 parts of said polyvinyl butyral was bonded to the interior surface of the innermost ½ inch thick sheet of polished plate glass of the impact striking portion. The test samples had an impact absorption section according to the construction of the present invention.

Control samples were also fabricated for the second ballistics test. These latter control samples had a glass ply having a thickness of 7/32 inch, or a thickness approximately equal to the total thickness of the impact absorption portion of the control laminates, instead of the laminated impact absorption portion of the test samples comprising two innermost sheets of thin glass and the polyvinyl butyral interlayer sheet. Otherwise, the test samples and control samples were identical for the second ballistic test.

Each of the units tested were prepared by assemblying the glass plies and plastic sheets in the order named hereinabove, inserting them within a plastic bag, evacuating the bag and subjecting the assembly within the evacuated bag to an oil autoclave at a pressure of 200 pounds per square inch and a temperature of about 275° for about 45 minutes. Each of the test samples was removed from the evacuation bag after the temperature and pressure was reduced gradually to room conditions.

A set of units of each type was subjected to ballistic tests, the results of which are reported below. The ballistic tests involved shooting 30 calibre bullets from a uniform distance. A thin sheet of aluminum foil 2 mils thick was located six inches behind each unit tested to serve as a witness plate that showed damage due to spalling of the innermost glass sheet of each tested laminate. The appearance of each witness plate was noted. While the exact velocities of the impacting bullets is classified, the relative velocities reported shows the improved resistance to penetration and reduction of spalling damage that results from substituting a laminated impact absorption section for the all glass impact absorption section of the prior art.

In the first test, using 30 calibre projectiles at various velocities against both the control samples having a thicker impact transition portion and a single plate of sheet glass as the impact absorption portion, and the test samples according to the present invention of the same total thickness, but having a thinner impact transition portion and a laminated impact absorption portion, the exact velocities cannot be given because they represent classified information. However, the test samples constructed according to the present invention defeated projectiles traveling at a relative velocity of 106 percent, with no perforation of the witness plate, whereas there was perforation of witness plates behind the control samples due to spall leaving the impact absorption portion of monolithic glass when the projectiles were fired from the same distance at a velocity assigned a relative value of 100 percent. Since the samples were not penetrated by the projectiles, any damage to the witness plates resulted from spalling of the innermost glass sheet of the multiplate laminate.

In the first ballistic test, the total thickness of the impact transition portion and of the impact absorption portion were kept substantially constant by adding to the thickness of the plastic comprising the impact transition portion of the control samples. In the second ballistic test, the thickness of the impact transition portions was kept constant and the control samples had an all glass impact absorption portion of approximately the same thickness as that of the laminated impact absorption portion of the test samples conforming to the present invention.

In the second ballistics test, exact velocities are again classified. However, witness plates behind control samples subjected to a velocity assigned a relative value of 100 percent (which is not the same velocity as that assigned a relative value of 100 percent for the first ballistics test) showed perforation, whereas a relative velocity of 110 percent onto the test samples failed to perforate their respective witness plates. This test showed that the construction of the present invention is less likely to produce spall dangerous to occupants of a vehicle so glazed than when the vehicle has a multilayered window of the prior art structure tested for comparison.

The results of these ballistics tests demonstrated the superiority of the impact absorption portions of the construction of the present invention over the monolithic construction of the prior art impact absorption portions. Projectiles at higher impact velocities impinging on the multilayered laminates constructed according to the present invention produced less dangerous spall than projectiles impinging at lower velocities on prior art constructions. Since the amount of spall increases with increasing velocity of the impinging projectile, it is obvious that the present construction is safer than prior art constructions.

Various samples are constructed for cold chipping tests. All of the samples tested for cold chipping had an impact striking portion comprising 4 sheets of glass ½ thick, with a sheet 0.020 inch thick of plasticized polyvinyl butyral containing 21 parts by weight of the aforementioned plasticizer per 100 parts of polyvinyl butyral between each pair of adjacent glass sheets. The samples of control group I had an impact absorption portion consisting of polyvinyl butyral plasticized with a plasticizer content of 21 parts by weight per 100 parts of polyvinyl butyral. The thickness of the impact absorption portion was 0.360 inch. The control group I samples had an impact absorption portion comprising a plate of glass 5/64 inch thick.

A second set of control samples in control group II was prepared for the cold chipping test. These latter control samples had an impact transition portion comprising a sheet of plasticized polyvinyl butyral 0.180 inch thick containing 21 parts of the aforesaid plasticizer by weight per 100 parts of polyvinyl butyral. A sheet of glass ¼ inch thick served as the impact absorption portion.

The test samples constructed for the cold chipping test had a sheet of plasticized polyvinyl butyral 0.180 inch thick containing 21 parts of the aforesaid plasticizer by weight for each 100 parts of polyvinyl butyral as the impact transition portion. The test samples had impact absorption portions of laminated glass as taught by the present invention. These laminated impact absorption portions comprised two glass sheets, each 5/64 inch thick and a plasticized polyvinyl butyral sheet 0.100 inch thick containing 21 parts by weight of said plasticizer for each 100 parts of polyvinyl butyral.

Two samples of each control group and two test samples were fabricated for this test. All six members were 6 inches by 12 inches in area and approximately 2.51 inch thick. The cold chipping test comprsied exposing the six samples to a temperature of minus 65° Fahrenheit and periodically inspecting them. After 3 hours of said low temperature exposure, one of the samples of control group I showed a chip on the inner surface of the innermost of the glass sheets of the impact striking portion. The temperature of the cold box containing the samples was lowered additionally. After 1 hour of exposure to further cooling, the other sample of control group I showed similar chipping, but there was no discernible damage in either the test group or the other control group.

The results of the cold exposure test indicated that multilayered laminates of the present invention were able to meet the cold temperature requirements tested and still provided ballistic properties superior to those of prior art multilayered laminates of the same total thickness.

In another ballistic test involving Group II control samples and test samples subjected to ballistic tests at a ballistic velocity sufficient to produce spalling in the impact absorption section of the Group II control samples but not sufficient to penetrate these samples, the test samples containing laminated impact absorption portions showed no spall at velocities that produced spall in the Group II control samples.

The present invention has been described in terms of certain illustrative embodiments and various changes may be made without departing from the scope of the invention as defined in the claimed subject matter that follows.

What is claimed is:

1. A multiplate safety glass comprising an outward facing, impact striking section including an outer ply of relatively thick glass, a plurality of intermediate plies of relatively thick glass, and an interlayer of transparent thermoplastic material adherent to glass interposed between adjacent glass plies, said interlayers separating said relatively thick glass plies being relatively thin and having a total thickness less than that of any of said relatively thick glass plies in the area intermediate adjacent of said relatively thick glass plies; an impact transition section comprising a relatively thick sheet of transparent thermoplastic interlayer material having a thickness greater than said total thickness in the area facing said glass plies; and an impact absorption section comprising a penultimate, relatively thin glass ply, an innermost, relatively thin glass ply and an interlayer of transparent, thermoplastic interlayer material separating said penultimate, relatively thin glass ply from said innermost, relatively thin glass ply, said interlayer of said impact absorption section having a thickness in the area between said relatively thin glass plies greater than those of said interlayers in said impact striking section and less than that of said impact transition section, the total thickness of said glass plies in said impact absorption section being less than the thickness of each of said plies of relatively thick glass in said impact striking section.

2. A multiplate safety glass as in claim 1, wherein said interlayers are composed of a material taken from the class consisting of plasticized polyvinyl acetal and a polyurethane.

3. A multiplate safety glass as in claim 2, wherein all of said interlayers are composed of plasticized polyvinyl butyral.

4. A multiplate safety glass as in claim 2, wherein all of said interlayers are composed of a polyurethane.

5. A multiplate safety glass as in claim 2, wherein at least one of said interlayers is composed of plasticized polyvinyl butyral and the remainder of said interlayers is composed of a polyurethane.

6. A multiplate safety glass as in claim 1, wherein said innermost, relatively thin glass ply has a maximum thickness of 0.100 inch.

7. A multiplate safety glass as in claim 6, wherein said interlayer of said impact absorption section has a thickness between about 20 percent and about 60 percent of the thickness of said relatively thick sheet of transparent, thermoplastic material of said impact transition section.

8. A multiplate safety glass as in claim 1, wherein said interlayer of said impact absorption section has a thickness between about 20 percent and about 60 percent of the thickness of said relatively thick sheet of transparent, thermoplastic material of said impact transition section.

* * * * *

UNITED STATES PATENT OFFICE
CERTIFICATE OF CORRECTION

PATENT NO. : 3,864,204
DATED : February 4, 1975
INVENTOR(S) : Norman Shorr and Harry E. Littell, Jr.

It is certified that error appears in the above-identified patent and that said Letters Patent are hereby corrected as shown below.

Column 8, line 44, Claim 1, "multiplate" should be --multilayered--.

Column 9, line 4, Claim 2, "multiplate" should be --multilayered--.

Column 9, line 8, Claim 3, "multiplate" should be --multilayered--.

Column 9, line 11, Claim 4, "multiplate" should be --multilayered--.

Column 9, line 13, Claim 5, "multiplate" should be --multilayered--.

Column 10, line 1, Claim 6, "multiplate" should be --multilayered--.

Column 10, line 4, Claim 7, "multiplate" should be --multilayered--.

Column 10, line 10, Claim 8, "multiplate" should be --multilayered--.

Signed and Sealed this twenty-second Day of July 1975

[SEAL]

Attest:

RUTH C. MASON
Attesting Officer

C. MARSHALL DANN
Commissioner of Patents and Trademarks